June 13, 1961 H. C. HURDLE 2,988,047
PIG CREEP FEEDER

Filed Sept. 30, 1958 3 Sheets-Sheet 1

INVENTOR.
Howard C. Hurdle,
BY
Cromwell, Greist + Warden
Attys

June 13, 1961 H. C. HURDLE 2,988,047
PIG CREEP FEEDER
Filed Sept. 30, 1958 3 Sheets-Sheet 2
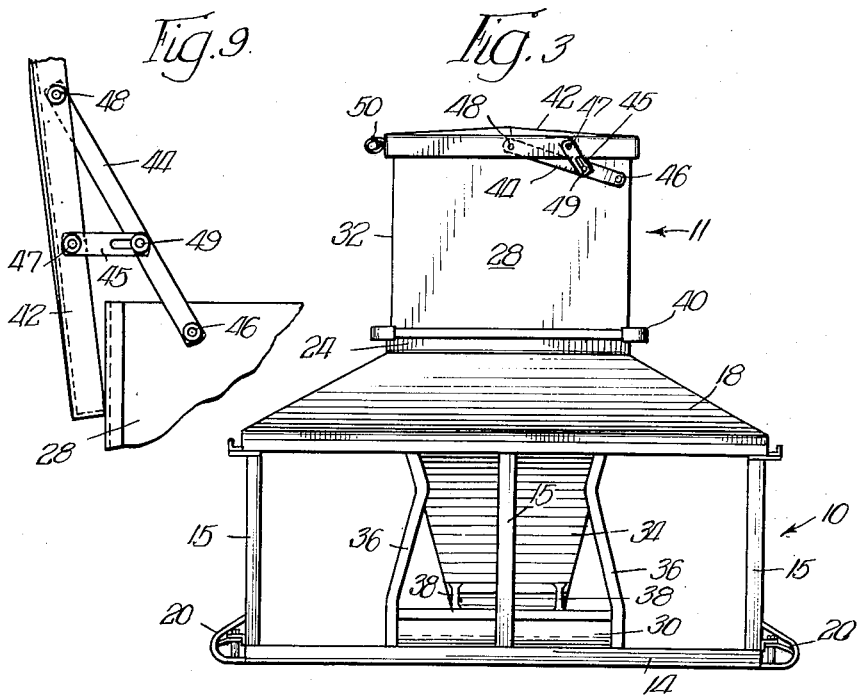
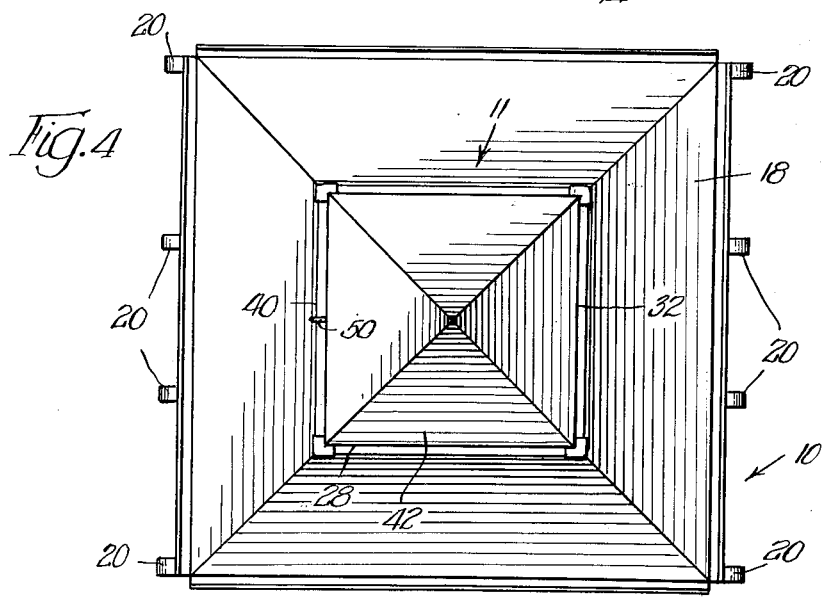
INVENTOR.
Howard C. Hurdle,
BY

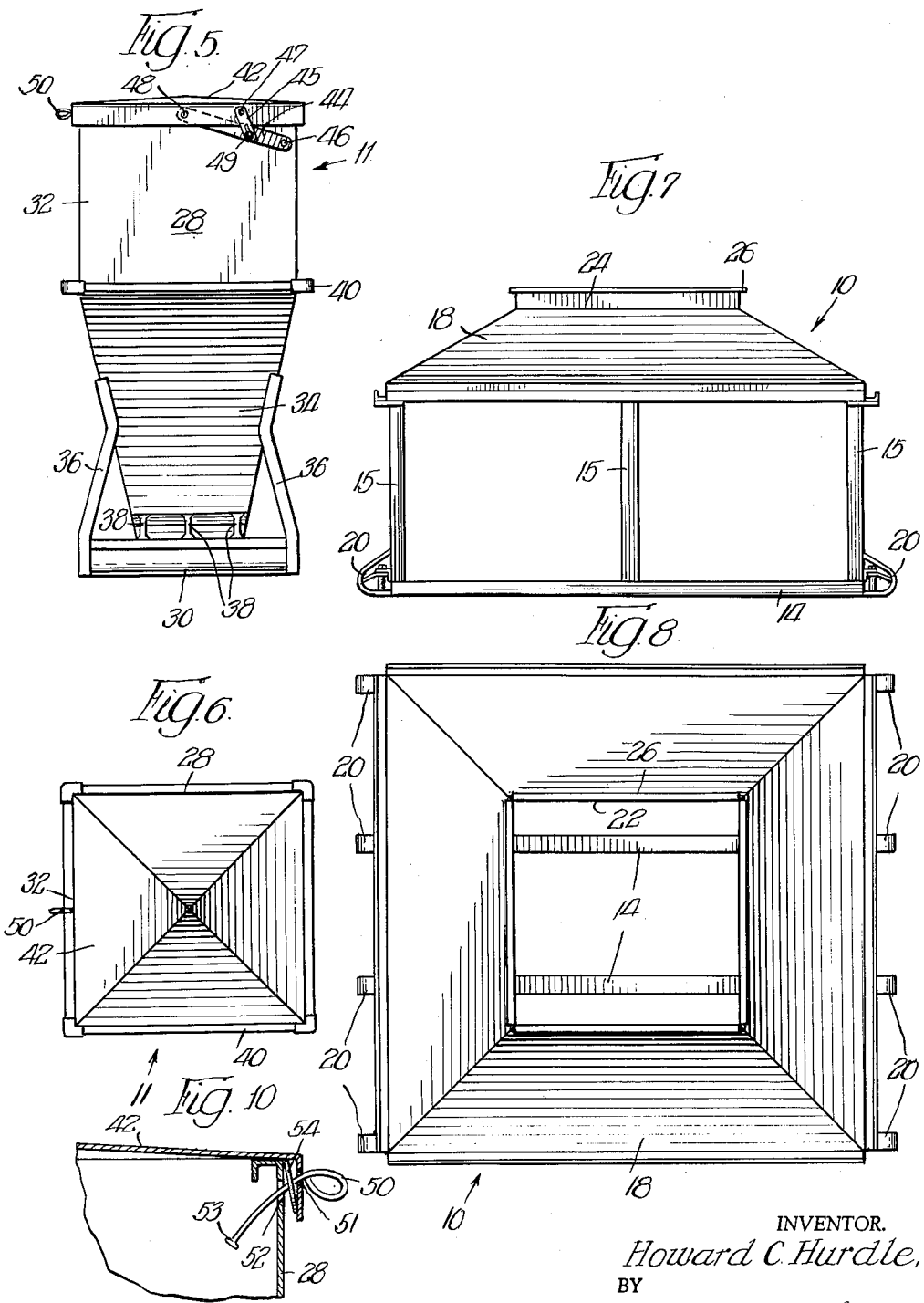

United States Patent Office 2,988,047
Patented June 13, 1961

2,988,047
PIG CREEP FEEDER
Howard C. Hurdle, Quincy, Ill., assignor to Moorman Manufacturing Company, Quincy, Ill., a corporation of Illinois
Filed Sept. 30, 1958, Ser. No. 764,442
6 Claims. (Cl. 119—52)

This invention relates to pig feeders of the type wherein means are provided for preventing hogs and other large farm animals from gaining access to the feed intended for the pigs. The means disclosed herein for keeping hogs and other large animals away from the pig feed is also adapted to protect the pig feed from the elements. The invention is particularly concerned with a pig feeder which can be used outside and which can also be used inside with or without the means for preventing access of hogs, etc. to the pig feed.

It is the general object of the invention to provide a new and improved pig feeder of the type known as a pig creep feeder.

An important object of the invention is to provide a pig creep feeder formed of two separable units which are easy to assemble and disassemble, one unit being removably insertable within an opening formed in the other unit.

Another important object of the invention is to provide a new and improved pig creep feeder having a first part in the form of a feed hopper with an attached feed trough and having a second part in the form of an opensided frame supporting an elevated canopy or hood having an opening formed therein, the first part being removably insertable within the opening in the second part, whereby the feed trough is protected from the elements by the canopy and the canopy acts to prevent hogs, etc. from reaching the trough.

Another object of the invention is to provide a two-part pig creep feeder of the character described which is simple and economical to fabricate and assemble, is sturdy, durable and compact, and is effective to protect the feed from the elements and from hogs and other large farm animals.

While the foregoing statements are indicative in a general way of the nature of the invention, other more specific objects and advantages will be apparent to those skilled in the art upon a full understanding of the construction, arrangement and purpose of the features of novelty incorporated in the new feeder shown in the accompanying drawings, wherein:

FIG. 3 is a side elevational view of the feeder, showing the two parts assembled;

FIG. 4 is a top plan view of the feeder;

FIG. 5 is a side elevational view of the hopper-trough part of the feeder;

FIG. 6 is a top plan view of the hopper-trough part;

FIG. 7 is a side elevational view of the frame-canopy part of the feeder;

FIG. 8 is a top plan view of the frame-canopy part;

FIG. 9 is an enlarged, fragmentary side elevational view of the hinge structure for the hopper lid, the lid being shown in its open position; and FIG. 10 is an enlarged, fragmentary side elevational view of the latch for the hopper lid.

Figure 1:
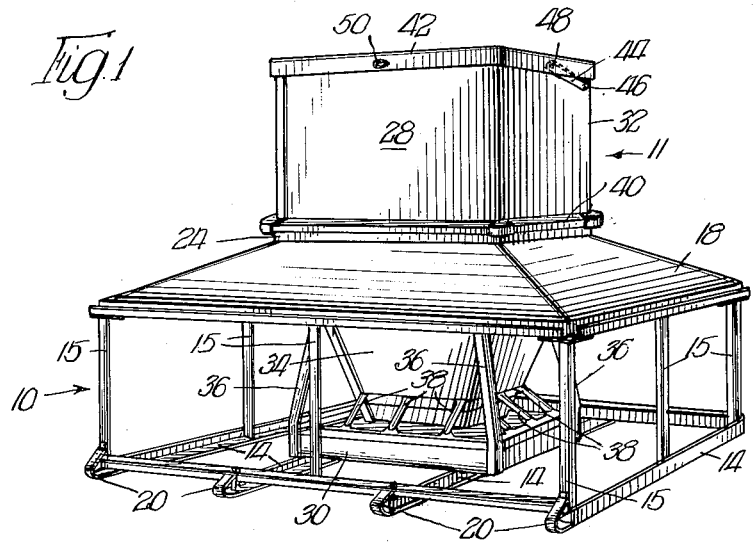
FIG. 1 is a perspective view of a preferred embodiment of the new two-part feeder, showing the two separable parts assembled together.
Figure 2:
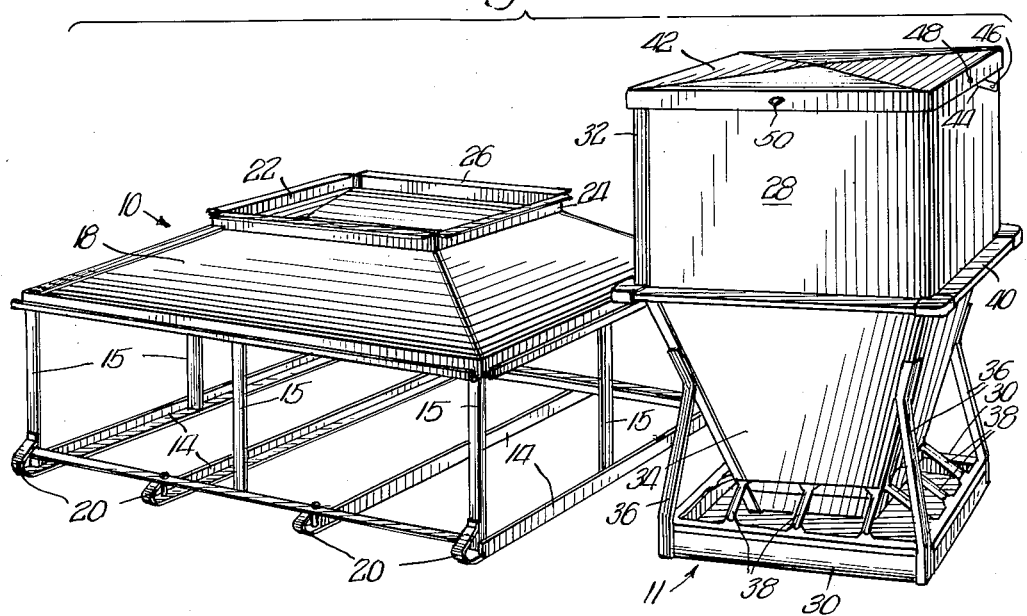
FIG. 2 is a perspective view of the two separable parts of the feeder, showing the two parts disassembled and arranged side-by-side.

As best shown in FIG. 2, the invention comprises two separable parts or units, namely, a frame-canopy unit 10 and a hopper-trough unit 11, each of which units may advantageously be fabricated of sheet metal and angle-bar bracing members. The two units are adapted to be interfitted with each other to provide the composite pig creep feeder shown in FIG. 1 by merely inserting the hopper-trough unit 11 into an opening in the top of the frame-canopy unit 10, as will be fully explained herein. In the preferred embodiment shown in the drawings the two units 10 and 11 are easily assembled and disassembled, in such manner that no fastening devices are required.

As best shown in FIGS. 1, 2, 7 and 8, the outer frame-canopy unit 10 comprises an opensided frame, which is preferably but not necessarily square in configuration, formed by a plurality of horizontally extending, ground-supporting crossbars 14 and a plurality of spaced, vertically extending structural members 15. The horizontal and vertical supporting members 14 and 15 of the frame are secured together by any conventional method. A canopy or hood 18 is supported on the upper ends of the vertical structural members 15 and is inclined slightly downwardly towards the outer edges thereof so that rain will drain outwardly off of the canopy. The outer edges of the canopy 18 are elevated sufficiently above the ground to permit ready access of pigs into the inside of the opensided frame while being close enough to the ground to prevent hogs and other large farm animals from putting their heads under the canopy. The ends of the horizontal ground-supporting crossbars 14 may be curved upwardly, as at 20, to define skids whereby the feeder may be easily moved from one place to another. As best shown in FIGS. 2 and 8, an opening 22 is formed in the center of the top of the canopy 18, which opening is preferably square in shape. An upstanding rim 24 is provided around the edge of the opening 22, which rim has a narrow flange 26 extending outwardly from its upper edge.

The hopper-trough unit 11 includes a feed hopper 28 and a feed trough 30 at the lower end of the hopper. The upper portion 32 of the hopper 28 may be square in configuration and approximately of the same size as the opening 22 in the top of the canopy 18. The sides of the lower portion 34 of the hopper 28 taper inwardly toward the bottom of the hopper to define a reduced opening at the lower end thereof. The feed trough 30 is fitted beneath and about the lower open end of the hopper 28 and is attached to the lower downwardly tapering portion 34 of the hopper by angle members 36. A series of inclined separating bars 38 extend from the outer edges of the trough 30 upwardly and inwardly to the tapered sides of the lower portion 34 of the hopper 28, the bars 38 being spaced apart to define a plurality of feeding spaces all the way around the feed trough 30, each of which is wide enough to receive the head of a single pig. This arrangement permits access by pigs to all sides of the feed trough 30. The peripheral dimensions of the feed trough 30 being no larger than the dimensions of the opening 22 provided in the top of the canopy 18, the hopper-trough unit 11 may be readily placed in position in the frame-canopy unit 10.

Intermediate the upper and lower portions 32 and 34 of the hopper 28, where the walls begin to taper inwardly, a downwardly turned flange 40 is provided which extends all the way around the hopper 28. The downwardly turned flange 40 is adapted to engage and fit over the upstanding rim 24 and flange 26 about the opening 22 in the top of the canopy 18 when the hopper-trough unit 11 is inserted downwardly through the opening 22 in the canopy 18 of the frame-canopy unit 10.

The open upper end of the hopper 28 is provided with a cover or lid 42 which may be hingedly attached thereto in any well known manner. The hinge connection shown in the drawings comprises a pair of link members 44 and 45 (FIG. 9) at each side of the lid 42.

Each link member 44 has one end pivotably connected externally to an upper corner of the hopper 28, as at 46, and has its other end pivotally connected internally to the approximate longitudinal midpoint of a depending side of the lid 42, as at 48. Each link member 45 has one end pivotally connected to the depending side of the lid 42 intermediate the connection 48 and the rear edge of the lid, as at 47, and its other end connected to the link member 44 intermediate the ends thereof by a pin-and-slot connection, as at 49.

If desirable, means may be provided to releasably latch the front edge of the lid 42 to the hopper 28. The lid latching means shown in the drawings and best shown in FIG. 10 comprises a hook member 50 adapted to be inserted through aligned openings 51 and 52 formed respectively in the depending front edge of the lid 42 and in the upper edge of the front of the hopper 28. The outer end of the hook 50 is bent in a manner to facilitate manual manipulation thereof and the inner end of the hook is enlarged or smashed, as at 53, whereby to confine a washer 54 on the shank of the hook adjacent the inner surface of the depending front edge of the lid 42. The confined washer 54 serves to insure non-removal of the hook 50 from the lid 42. The opening 52 in the front edge of the hopper 28 is sufficiently large to permit movement of the enlarged end 53 of the hook 50 therethrough. To open the lid 42, the hook 50 is pulled outwardly until the enlarged end 53 passes completely through the opening 52 whereby the hook is disengaged from the hopper 28, thus permitting raising of the lid 42. After the lid 42 is closed, the inner end of the hook 50 is pushed through the opening 52 in the hopper 28 whereupon the lid 42 is latched in its closed position.

The separable two-part pig creep feeder disclosed herein is particularly well adapted for use outside inasmuch as the feed is not only protected from the elements by the canopy 18 but also is protected from hogs and other large farm animals. Once the hopper 28 has been loaded with the proper feed for pigs, the feed is available in the feed trough 30 and is readily accessible to pigs which may "creep" under the canopy 18 and eat from any side of the feed trough 30. If the pigs are housed within a building, as during the winter, and are segregated from the hogs and other farm animals, the hopper-trough unit 11 may be used separately, that is, without inserting it into the opening 22 of the canopy 18 of the frame-canopy unit 10, the feed trough 30 being adapted to support the hopper-trough unit 11 directly on the ground or floor of the building. Using the hopper-trough unit 11 separately when inside results in a considerable saving of space when it is unnecessary to protect the feed from the elements and from hogs and other large animals.

When it is desirable to use the feeder outside, it is a simple operation for one or two persons to pick up the hopper-trough unit 11 and insert it downwardly through the opening 22 in the canopy 18 of the frame-canopy unit 10 until the downwardly turned flange 40 on the hopper 28 engages the flange 26 of the canopy opening 22, after which the hopper 28 is filled with feed and the feeder is ready to be used. Conversely, it is just as simple to separate the two units.

Other modifications and variations of the invention may be made without departing from the spirit and scope thereof, and therefore only such limitations should be imposed as are indicated in the appended claims.

I claim:

1. A pig creep feeder comprising, an opensided frame adapted to permit the entrance of pigs therein and characterized by an elevated canopy having an opening formed centrally in the top thereof, and a removable unit insertable through the opening in the top of the canopy and characterized by a feed hopper extending above and below the canopy, by a cover hingedly attached to the upper end of the feed hopper, and by a feed trough suspended from the lower end of the hopper, the outer dimensions of said trough being less than the corresponding dimensions of said opening.

2. A pig creep feeder comprising, a first unit in the form of an opensided frame characterized by an elevated canopy having an opening formed centrally in the top thereof, a second unit insertable through the opening in the top of the canopy and characterized by a feed hopper extending through the opening, a cover hingedly attached to the upper end of the feed hopper, and a feed trough suspended from the lower end of the hopper of a size not exceeding the size of the opening in the top of the canopy, said feed hopper and said opening in the canopy being of approximately the same size, and interengageable means formed respectively about the opening in the canopy and about the feed hopper approximately midway between the upper and lower ends thereof.

3. A pig creep feeder comprising, a first unit in the form of an opensided frame and characterized by an elevated canopy having an opening formed centrally in the top thereof, and a horizontally extending rim around the edge of said opening, a second unit insertable through the opening in the top of the canopy and characterized by a feed hopper extending through the opening, a cover hingedly attached to the upper end of the feed hopper, a feed trough suspended from the lower end of the hopper of a size not exceeding the size of the opening in the top of the canopy, and a horizontally extending flange around the hopper approximately midway between its upper and lower ends, said flange on the hopper being engageable with said rim at the edge of the opening in the canopy.

4. In a pig creep feeder, a first unit comprising, an opensided frame, a canopy supported on said frame, said canopy being elevated sufficiently above the ground to permit pigs to enter said frame through the open sides thereof while being close enough to the ground to prevent hogs and other large farm animals from putting their heads under the canopy, said canopy being provided with an opening in the top of the same, and a second unit comprising, a feed hopper, a cover hingedly attached to the upper end of the hopper, and a feed trough suspended from the lower end of said hopper, said feed trough being smaller in size than the opening in said canopy and said feed hopper being of approximately the same size as the opening in the canopy, whereby said second unit is removably insertable in the opening formed in the canopy of said first unit to provide a feeder wherein the feed trough is protected from the elements and from hogs and other large farm animals by said canopy.

5. In a pig creep feeder of the character described in claim 4, an upwardly and outwardly extending rim disposed about the opening formed in said canopy, and an outwardly and downwardly extending flange disposed about said feed hopper approximately midway between the upper and lower ends thereof, said flange being engageable with said rim when said second unit is inserted in the canopy opening of said first unit.

6. A pig creep feeder comprising, a four-sided frame structure open at all four sides and characterized by a plurality of horizontally disposed interconnected structural members defining a generally square supporting base, by a plurality of vertically disposed structural members supported by said base and extending upwardly in spaced apart relationship from the corners and sides of said generally square base, and by four generally trapezoidal-shaped panel members each of which has its longest edge supported above one of the sides of said generally square base on the upper ends of certain of said vertically disposed structural members, said panel members being inclined inwardly and upwardly with their adjacent side edges joined together whereby to provide a canopy having a generally square opening formed centrally therein, the short upper edge of each of said panels being bent upwardly and then outwardly whereby to provide a rim about said canopy opening, a vertically disposed four-sided feed hopper generally square in horizontal cross section and of a size permitting insertion thereof downwardly through said central opening in said canopy of said open-sided frame structure, an outwardly projecting flange extending about said hopper approximately midway between the upper and lower ends thereof and adapted for supporting engagement on said rim about said canopy opening, the portions of the sides of said hopper above said flange being disposed vertically and the portions of the sides of said hopper below said flange being inclined inwardly toward the lower end of the hopper to provide a reduced-in-size feed discharge opening at the bottom of the hopper, a cover hingedly attached to the top of the hopper, and a generally square feed trough of a size smaller than said canopy opening and larger than the feed discharge opening of the hopper suspended from the lower portion of the hopper beneath said discharge opening therein, said canopy being elevated sufficiently above said base whereby the feed trough is readily accessible to pigs while being close enough to said base to keep hogs and other large farm animals away from said feed trough.

References Cited in the file of this patent

UNITED STATES PATENTS

| | | |
|---|---|---|
| 342,546 | Sherman | May 25, 1886 |
| 1,468,205 | Julian | Sept. 18, 1923 |
| 1,583,828 | Hayes | May 11, 1926 |
| 1,759,320 | Mosel | May 20, 1930 |
| 2,667,858 | Cussotti | Feb. 2, 1954 |
| 2,725,663 | Mullen | Dec. 6, 1955 |